United States Patent Office 2,768,960
Patented Oct. 30, 1956

2,768,960

TERNARY COMPLEXES OF PERHALOCARBONS, ALUMINUM TRIHALIDES AND PHOSPHOROUS TRIHALIDES

John L. Van Winkle, San Lorenzo, and Rupert C. Morris, Berkeley, Calif., assignors to Shell Development Company, Emeryville, Calif., a corporation of Delaware No Drawing. Application March 17, 1953,
Serial No. 342,974

18 Claims. (Cl. 260—448)

This invention pertains to new and useful organic chemical products and to a process for their preparation.

We have discovered in accordance with our invention that carbon tetrachloride, aluminum chloride and phosphorus trichloride can be caused to combine to form a novel ternary complex, or reaction product, containing in combined form substantially one mole each of carbon tetrachloride, aluminum chloride and phosphorus trichloride. The novel complex, or reaction product, has been found to have the composition that is represented by the empirical formula $CCl_4 \cdot AlCl_3 \cdot PCl_3$. The structure of this novel complex, or reaction product, can be more precisely indicated by the probable formula $$[CCl_3PCl_3]^+[AlCl_4]^-$$

This reaction product or ternary complex, when isolated in the substantially pure state, usually is a hard, rather brittle solid, grayish to white in color, generally rather opaque, and suggestive in superficial appearance of somewhat impure quartz. When in relatively massive form this solid product can be fractured by a sharp blow, somewhat as ice can be fractured. It can also be produced in the form of fine crystalline particles which are suggestive of common table salt in superficial appearance, or as rounded pellets of substantially uniform size in each batch but varying somewhat in size, as desired, from batch to batch.

We produce this novel complex, or reaction product, by mixing carbon tetrachloride, phosphorus trichloride and aluminum trichloride in suitable proportions and maintaining the mixture at a temperature preferably of from about 40° C. to about 50° C. until the complex has formed and precipitates from the mixture. The reaction mixture may be stirred with advantage during the course of the reaction. Depending upon the particular reaction conditions, the aluminum trichloride more or less completely dissolves during the course of the reaction, forming a slurry of residual, undissolved aluminum trichloride in the liquid mixture, or even a thick and somewhat inhomogeneous wholly liquid mixture. As the reaction progresses, the solid ternary complex or reaction product commences to appear in solid form, as crystalline particles, as a heavy coherent massive precipitate, as pellets, or the like depending upon the reaction conditions, the degree of agitation, etc. The reaction should be carried out under anhydrous conditions as by shielding the reaction mixture with a blanket of dry inert gas, such as nitrogen, or in a reaction vessel from which atmospheric moisture is excluded, as with the aid of a drying tube filled with a desiccant. When, as is usual, the carbon tetrachloride is employed in large excess, the precipitated complex or reaction product can be recovered simply by decanting the excess carbon tetrachloride or by filtering. The product can also be recovered by evaporating the excess carbon tetrachloride together with any unconsumed phosphorus trichloride. Yields of the solid ternary complex, 90% and higher based on the yield theoretically obtainable, have been obtained under a variety of specific reaction conditions.

In making up the reaction mixture, the carbon tetrachloride, aluminum trichloride and the phosphorus trichloride may be mixed in any desired order or all three may be mixed simultaneously.

The aluminum chloride and the phosphorus trichloride, most desirably are employed in about equimolar amounts relative to each other. Moderate excesses of either are not disadvantageous, however. When the phosphorus trichloride is used in excess, relative to the aluminum trichloride, the excess phosphorus trichloride can be separated from the solid reaction product as by evaporation in vacuo. Unconsumed aluminum trichloride, when present, is not as readily separated from the ternary complex and tends to remain with the precipitated complex, apparently as a solid solution of aluminum trichloride in the solid ternary complex or, possibly, as particles of aluminum trichloride dispersed in a matrix composed of the solid complex. The aluminum chloride can be separated from the mixture by dissolving the complex in a solvent in which the aluminum chloride is insoluble, such as methylene chloride, filtering, and evaporating the solvent to recover the complex or reaction product from the filtrate. The aluminum trichloride and the phosphorus trichloride preferably are employed in relative proportions that correspond to a mole ratio $AlCl_3:PCl_3$ of from about 2:1 to 1:2. The carbon tetrachloride preferably is employed in substantial excess, the excess over the amount which is required for formation of the ternary complex serving as a solvent or a diluent in the reaction mixture. From about two to about ten moles of carbon tetrachloride per mole of phosphorus trichloride is a generally suitable amount, although larger quantities can be employed if desired.

The reaction between the carbon tetrachloride, phosphorus trichloride, and aluminum trichloride proceeds readily at temperatures between about 40° C. and about 50° C. Indeed, both for optimum yields at moderate reaction times and for high purity of the product, this range of temperatures has been indicated to be relatively critical. Temperatures moderately higher than 50° C. can be used and are operable, although dark tarry materials tend to be formed at temperatures much above 50° C. and the desired product is consequently somewhat less pure. Temperatures below 40° C. can also be used, although the length of time required for completion of the reaction increases rapidly as the temperature is decreased below about 40° C. At, say, 40° C. the reaction between the aluminum chloride, phosphorus trichloride and carbon tetrachloride usually will require from about one to two hours for completion. Reaction times substantially longer than about two hours at about 40° C. tend to lead to the formation of dark, tarry materials which discolor the solid ternary complex. Of course, for some purposes the discoloration or impurity of the product may not be objectionable.

The indicated probable structural formula for the novel ternary complex or reaction product of our invention will be seen to be that of a salt of perchloromethyltrichlorophosphonium hydroxide with the Werner-type complex of hydrogen chloride and the strongly acidic (in the Lewis sense) aluminum trichloride, although in mechanism the reaction does not, insofar as is known, involve either this base or this Werner-type acid per se. In accordance with the invention, there may be employed in place of the aluminum chloride other aluminum salts of strong hydrohalic acids (HCl, HBr, and HI which, in aqueous solution, are strongly dissociated or ionized, i. e., are strong acids) and ternary complexes or reaction products of carbon tetrachloride, phosphorus trichloride, and such other aluminum salts of strong hydrohalic acids prepared. These complexes or reaction products which are included within the more generic aspects of our invention, likewise have the probable structure of salts of perchloromethyltrichlorophosphonium hydroxide with the Werner-type complex of hydrogen chloride and the corresponding aluminum trihalide. Other aluminum trihalides than aluminum trichloride which we may employ thus are aluminum tribromide, and, less desirably, aluminum triiodide. We may also employ mixed aluminum salts of a plurality of strong hydrohalic acids, such as aluminum dichlorobromide, aluminum chlorodibromide, or mixed aluminum trichloride and aluminum tribromide. The salts of aluminum and the middle halogens (that is, chlorine and bromine) are preferred.

In accordance with the invention there may be employed in place of carbon tetrachloride higher perhalomethanes than carbon tetrachloride (substitution products of $CCl_4$ by halogen of higher atomic weight than chlorine) such as trichlorobromomethane, carbon tetrabromide, dichlorodibromomethane, tribromochloromethane, trichloroiodomethane and tetraiodomethane. Also, we may employ in place of phosphorus trichloride higher phosphorus trihalides than phosphorus trichloride (substitution products of $PCl_3$ by halogen of higher atomic weight than chlorine), including phosphorus tribromide, phosphorus triiodide, phosphorus chlorodibromide, phosphorus bromodichloride, and the like. As a class, the novel ternary complexes that are provided by our invention can be described by the empirical formula $CX_4 \cdot PX_3 \cdot AlX_3$ and the probable structure of such complexes can be represented by the formula $$[CX_3PX_4]^+[AlX_4]^-$$

In these formulae, C represents the carbon atom, P represents the phosphorus atom, Al is the symbol for aluminum and each X represents an atom of an acidogenic halogen, that is, a halogen whose hydrohalic acid is a strong acid, i. e., chlorine, bromine, or iodine, which atoms of halogen may be the same or different. For most practical purposes the halogen atoms represented by X each desirably are middle halogens (chlorine or bromine).

Although the preferred products of our invention are those complexes, or reaction products, of carbon tetrachloride or tetrabromide, phosphorus trichloride or tribromide, and aluminum trichloride or tribromide, according to a still further related aspect of the invention we have discovered that there may be employed in place of the carbon tetrachloride, aliphatic perchlorocarbons containing a plurality of carbon atoms and that, in this manner, there can be obtained novel ternary complexes of such higher aliphatic perchlorocarbons with aluminum trihalides and phosphorus trihalides. In place of these higher aliphatic perchlorocarbons there can be employed corresponding compounds in which one or more of the chlorines of the perchlorocarbon has or have been replaced by another acidogenic halogen, i. e., bromine or iodine.

It will be seen that the invention excludes all halogen-substituted hydrocarbons in which less than all of the hydrogen atoms are replaced by acidogenic halogen. For example, ethylidene dichloride, having the formula $CH_3CHCl_2$, contains hydrogen and, therefore, is not a compound composed exclusively of carbon and acidogenic halogen. It is only from aliphatic compounds composed exclusively of carbon and acidogenic halogen that the novel ternary complexes of our invention can be prepared.

A typical group of the compounds of carbon and acidogenic halogen which may be employed for the purposes of our invention are those of the formula $C_nX_{2n+2}$ in which C represents the carbon atom, X represents an acidogenic halogen and $n$ is a whole positive number, X preferably being bromine or chlorine, i. e., a middle halogen. These typical starting materials which may be employed for the preparation of novel products of our invention include the perchloroalkanes, such as the perchloroethane, perchloropropane, perchlorobutanes, perchloropentanes, perchlorohexanes, perchloroheptanes, perchlorooctanes and their homologs, and their analogs containing either or both bromine or iodine, such as dibromooctachlorobutane, 1,1,1,2 - tetrachloro-2,2,3,3,3-pentabromopropane, 1,2-dibromo-2,2,3,3,4,4,4-nonachlorobutane and the like and their homologs and analogs. There also may be used corresponding cycloalkanes, such as perchlorocyclopentane, perchlorocyclohexane and perbromomethylcyclopenane. The carbon compounds which are employed for the preparation of the novel complexes, or reaction products, of our invention are not limited according to the number of carbon atoms which they contain although the most readily available and hence the most practical are those which contain from one to about eight carbon atoms. The halogens thereof may be the same or they may be different. The perhalohydrocarbon which is employed preferably is one containing only bromine or chlorine, although the iodine may also be present.

Although the preferred aliphatic compounds of carbon and acidogenic halogen are those that are saturated, i. e., contain only univalent linkages, we have found in accordance with our invention that novel ternary complexes or reaction products can be prepared from corresponding unsaturated compounds composed exclusively of carbon and acidogenic halogen. For example, we have prepared, in high yield, a novel ternary complex of phosphorus trichloride, aluminum trichloride and perchlorocyclopentadiene, the complex having the probable formula $C_5Cl_6 \cdot PCl_3 \cdot AlCl_3$. There can be employed in place of the perchlorocyclopentadiene other unsaturated aliphatic compounds composed of carbon and chlorine, bromine, and/or iodine, which may be cyclic or acyclic, including the perchloro-olefins and their analogs derived from higher halogens, such as perchloroethylene, perchloropropylene, perchloro-1-octene, 1-bromo-perchloro-1-butene, perchlorobutene and perchloropentene; and multiply unsaturated compounds, such as perhaloisoprene, perchlorodiallyl, and perchlorobutadiene; and cyclic analogs, such as perbromomethylcyclopentene, perchlorocyclohexene, perbromocyclopentene, perchloroethylpentachlorobenzene, tribromomethylpentachlorobenzene, and perchlorocyclopentene.

Broadly then, our invention comprises novel ternary complexes, or reaction products, having the probable structural formula [perhalocarbyl·$PX_4$]$^+$[$AlX_3$]$^-$, in which the term "perhalocarbyl" signifies the radical which is formed by removal of one atom of halogen from a perhalocarbon, and in which X represents chlorine, bromine or iodine. These novel ternary complexes may be regarded as being salts of aliphatic perchlorohydrocarbyltrichlorophosphonium hydroxides with Werner-type complexes of strong hydrohalic acids and salts of aluminum and strong hydrohalic acids, and corresponding compounds of the halogens higher than chlorine, i. e., wherein one or more of the chlorines of the perchlorohydrocarbyltrichlorophosphonium hydroxide has been replaced by a halogen higher than chlorine, preferably bromine. The novel reaction products of the invention include those having compositions represented by the probable formula $$C_nX_{2n+2} \cdot PX_3 \cdot AlX_3$$

and having the structures represented by the probable formula [$C_nX_{2n+1}PX_4$]$^+$[$AlX_4$]$^-$ in which C represents the carbon atom, P represents the phosphorus atom, Al represents aluminum, and X represents acidogenic halogen, preferably bromine or chlorine, i. e., preferably a middle halogen. Where the carbon compound that is used as starting material is saturated and alicyclic the generic probable empirical formula is as follows:

$$C_nX_{2n} \cdot PX_3 \cdot AlX_3$$

and the generic probable structural formula is as follows: [$C_nX_{2n-1}PX_3$]$^+$[$AlX_4$]$^-$. Generically, the novel complexes, or reaction products, of our invention can be described by the probable empirical formula perhalocarbon·$PX_3·AlX_3$ and by the probable generic structural formula [perhalocarbyl·$PX_4$]$^+$[$AlX_3$]$^-$, in which "perhalocarbon" represents the aliphatic compound composed exclusively of carbon and acidogenic halogen and "perhalocarbyl" the radical which is formed by removal of one atom of halogen therefrom, and in which P, Al, and X each have the significance defined above. The novel complexes may be prepared according to the invention by admixture of the aliphatic perhalocarbon, the trihalide of phosphorus and acidogenic halogen and the aluminum salt of a strong hydrohalic acid and subsequent reaction at temperatures preferably within the range of about 0° C. to about 50° C. Temperatures above 50° C. and up to about 100° C. may be used and are operable, although they are less desirably used. The aliphatic perhalocarbon preferably is employed in excess, amounts up to ten or more moles per mole of the trihalide of phosphorus being satisfactory, while the trihalide of phosphorus and the aluminum salt of the strong hydrohalic acid preferably are employed in amounts about stoichiometrically equivalent to each other. More broadly, for each mole of the phosphorus trihalide there may be employed from about 0.1 to about 10 equivalents of the aluminum trihalide and from about 1 to about 10 or more moles of the aliphatic perhalocarbon, the aluminum trihalide preferably being employed in an amount not substantially exceeding the amount required for formation of the ternary complex with the amounts of the phosphorus trihalide and the aliphatic perhalocarbon employed. The reactants may be mixed in any order. The reaction advantageously may be conducted with vigorous agitation of the reaction mixture. By varying the degree of agitation, the reaction temperature, and the relative amounts of the reactants, the novel products of the invention can be obtained in various physical forms which may be varied according to the uses to which the products are to be put.

The following examples are intended for the purpose of illustrating the invention. It will be appreciated that the examples are not intended to limit the invention, since the invention is susceptible to modification without departure from the letter and spirit of the appended claims.

Example I

Twenty-six grams of aluminum trichloride and 27 grams of phosphorus trichloride were added to a glass flask equipped with a reflux condenser. The flask and its contents were cooled to below 10° C. and then 78 grams of carbon tetrachloride were added. The reaction mixture warmed over a period 75 minutes to 19° C., whereupon an additional 82 grams of carbon tetrachloride were added. After an additional 3.25 hours the mixture had warmed to 46° C., the solids initially present had passed into the liquid state and an immiscible oily liquid layer had formed. Five minutes later solids commenced to precipitate from the mixture. The mixture was heated at 45–55° C. for an additional half hour and then allowed to stand overnight at the ambient temperature, by which time a copious grey precipitate had formed, composed of the ternary complex of aluminum chloride, phosphorus trichloride, and carbon tetrachloride. The complex was recovered by decantation of the excess carbon tetrachloride.

Example II

There were mixed 333 grams of $AlCl_3$ and 343 grams of $PCl_3$, and 3000 grams of $CCl_4$ were added to the mixture. The mixture then was heated under reflux for two hours at 40–45° C. At the end of this time the ternary complex of $AlCl_3$, $CCl_4$ and $PCl_3$ was present as a white crystalline solid suggestive of common table salt in appearance. The mixture was filtered, the solid complex was washed with a small amount of carbon tetrachloride and dried. There was recovered 980 grams of the complex, representing a 93 percent yield of the complex, based on theory, and 2422 grams of unconsumed carbon tetrachloride.

Example III

There were mixed 467 grams of $AlCl_3$ and 343 grams of $PCl_3$, and 3000 grams $CCl_4$ then were added. The resulting mixture was heated under reflux for two hours at 40–45° C. In the presence of the excess $AlCl_3$ (mole ratio $AlCl_3:PCl_3=3.5:2.5$) the complex was produced in the form of a gray gelatinous mass which, after filtration and drying, weighed 1094 grams. When 95 grams of the complex was powdered and heated under about 20 mm. Hg pressure on the steam bath for 12 hours there was no change in weight that could be detected on a balance sensitive to 0.5 gram.

Example IV

There were mixed 343 grams of $PCl_3$ and 3000 grams of $CCl_4$ and the mixture was heated to 40° C. Three hundred thirty-three grams of $AlCl_3$ then were run into the mixture over 10 minutes while vigorously stirring. The resulting mixture was heated for two hours at 40–45° C. The complex was a clean, white solid mass which tended to adhere to the walls of the glass reaction vessel. When dry the product weighed 1023 grams, representing a yield 96.5 percent of theory. The recovered carbon tetrachloride weighed 1971 grams.

Example V

In this experiment, wherein there was employed an excess of $PCl_3$ relative to the $AlCl_3$, 172 grams of $AlCl_3$ and 343 grams of $PCl_3$ were mixed. There were added 3000 grams of $CCl_4$ and the mixture was heated with vigorous stirring for two hours at 40–45° C. The complex precipitated in the form of extremely hard, white, round pellets about 2–3 mm. in diameter. The pellets were slightly deliquescent. The yield was 92.4 percent of theory.

Example VI

A 15 gram sample of the complex of $AlCl_3$, $PCl_3$ and $CCl_4$ prepared as in Examples I to V was dissolved in 200 cc. of methylene chloride, the solution was filtered and then was evaporated on the steam bath until about 75 cc. of the methylene chloride had been removed. The remaining solution was cooled in an ice-bath to crystallize the complex, and the crystalline precipitate was filtered off and dried. The melting point of the recrystallized complex was found to be about 100° C. Analyses were as follows: Found: 80.2% Cl; 7.4% P; 7.0% Al. Calculated for $CCl_{10}PAl$: 83.6% Cl; 7.3% P; 6.4% Al.

Example VII

There were mixed 134 grams of $AlCl_3$ and 139 grams $PCl_3$, and 400 grams of $CCl_4$ then were added with stirring. The mixture was heated at 40–50° C. for 45 minutes and then cooled, the complex forming as a reddish-brown granular precipitate.

Example VIII

The complex of $AlCl_3$, $PCl_3$ and $CCl_4$ prepared in Example II was hydrolyzed to yield trichloromethanephosphonic dichloride. There were mixed 710 grams of ice, 237 grams of hydrochloric acid (d.=1.19) and 1060 grams methylene chloride. The mixture was cooled to $-5°$ C. and 300 grams of the complex were added slowly while vigorously stirring the mixture. After a reaction time of 30 minutes the aqueous phase of the mixture was separated from the organic phase and the organic phase was evaporated to dryness. There were obtained 167 grams of crude trichloromethanephosphonic dichloride. The structural formula of this dichloride is as follows: $CCl_3P(O)Cl_2$.

Example IX

There were mixed 138 grams of $PCl_3$ and 134 grams of $AlCl_3$. To the mixture there were added 546 grams of perchlorocyclopentadiene over a period of 0.5 hour. The mixture was stirred for two hours at 40–45° C. and then cooled. The complex of perchlorocyclopentadiene, AlCl₃, and PCl₃ was obtained as a darkish gummy solid, amount about 396 grams.

*Example X*

Equimolar amounts of aluminum tribromide and phosphorus tribromide are mixed at about 0° C. and to the mixture there is added 8.73 moles of perchloropropylene. The mixture is permitted to react at temperatures up to about 40° C. for about one hour and then is stripped of unconsumed starting materials by evaporation in vacuo. The ternary complex of perchloropropylene, aluminum tribromide and phosphorus tribromide, which ternary complex remains as residue from the evaporation, has the probable formula $C_6Cl_6 \cdot PBr_3 \cdot AlBr_3$.

*Example XI*

The complex of aluminum trichloride, perchlorocyclopentane and phosphorus trichloride is prepared according to the procedure illustrated in Example IX. The complex has the probable empirical formula $$C_6H_{10} \cdot PCl_3 \cdot AlCl_3$$

The products of our invention provide a unique and apparently novel type of organic compound. For example, it will be seen that the ternary complex of carbon tetrachloride, phosphorus trichloride, and aluminum trichloride, while containing carbon and therefore an "organic compound," contains but 2.7% of carbon and is composed otherwise of the three elements phosphorus, chlorine, and aluminum. By virtue of their unusual composition and structure, the novel products of our invention can be used for various purposes. They are useful as chemical intermediates. By hydrolysis they may be converted to useful acid halides of phosphonic acids. Such hydrolysis of one of the complexes of our invention is specifically illustrated in Example VIII. The phosphonic acid halides can be converted in turn to materials which are useful as additives for lubricating oils. The novel complexes may be converted by hydrolysis also to the phosphonic acids per se; for example, such hydrolysis of the complex of aluminum trichloride, phosphorus trichloride, and carbon tetrachloride provides the first practical synthesis known to us of the valuable acid trichloromethanephosphonic acid. The novel products of our invention include materials which may be employed in appropriate cases as intermediates for the preparation of insecticides, fungicides, nematocides, and the like. The novel products of our invention may be employed in themselves as catalysts for various organic reactions, such as alkylation and related processes. The novel products of our invention are not uniformly oil soluble. Those products that are soluble in oils, including either or both lubricating oils of the petroleum-based variety and the synthetic lubricating oils, may be employed to impart improved properties, such as extreme pressure properties, to the lubricating oil.

It will be appreciated that there are various specific embodiments of the invention which may be practiced without departure from the letter and the spirit of the appended claims.

We claim as our invention:

1. A ternary equimolar complex of aluminum chloride, carbon tetrachloride, and phosphorus trichloride.

2. The perchloromethyltrichlorophosphonium salt of a Werner-type complex of aluminum trichloride and a strong hydrohalic acid.

3. A chemical product having the structure represented by the formula $[C_nX_{2n+1}PX_3]^+[AlX_4]^-$ in which each X represents an atom of halogen selected from the class consisting of chlorine, bromine and iodine, $n$ is an integer, and C, P, and Al represent carbon, phosphorus and aluminum, respectively.

4. A ternary equimolar complex of aluminum trichloride, phosphorus trichloride and perchlorocyclopentadiene.

5. A ternary equimolar complex of an alicyclic perchlorocarbon, aluminum trichloride and phosphorus trichloride.

6. The perchloromethyltrichlorophosphonium salt of the Werner-type complex of a strong hydrohalic acid and an aluminum salt of a strong hydrohalic acid.

7. A ternary equimolar complex of a perchloroalkane, aluminum trichloride and phosphorus trichloride.

8. A ternary equimolar complex of a perchloroolefin, an aluminum salt of a strong hydrohalic acid, and a phosphorus trihalide, the halogen whereof is a halogen whose hydrohalic acid is a strong acid.

9. A ternary equimolar complex of a perbromocarbon, a phosphorous trihalide, the halogen whereof is a halogen whose hydrohalic acid is a strong acid, and a salt of aluminum and a strong hydrohalic acid.

10. A perchlorocyclodienyltrichlorophosphonium salt of the Werner-type complex of a strong hydrohalic acid and an aluminum salt of a strong hydrohalic acid.

11. A ternary equimolar complex of an aliphatic perhalocarbon, a phosphorus trihalide and an aluminum halide, the halogen of said complex being selected from the class consisting of chlorine, bromine and iodine.

12. The process which comprises mixing aluminum chloride, carbon tetrachloride and phosphorus trichloride and causing the mixture to react at a temperature of about 40° C. to about 50° C. until a ternary equimolar complex of said three materials with each other is produced.

13. The process which comprises mixing carbon tetrachloride, phosphorus trichloride and an aluminum salt of a strong hydrohalic acid and causing the mixture to react at a temperature up to about 50° C. until a ternary equimolar complex of said three materials with each other is formed.

14. The process which comprises mixing perchlorocyclopentadiene, aluminum trichloride, and phosphorus trichloride and causing the mixture to react at temperatures up to about 50° C. until a ternary equimolar complex of said three materials with each other is formed.

15. The process which comprises mixing a perchlorocarbon, a phosphorous trihalide, the halogen whereof is halogen whose hydrohalic acid is a strong acid, and an aluminum salt of a strong hydrohalic acid to produce a ternary equimolar complex of these materials with each other.

16. The process which comprises mixing a perchloroalkane, a phosphorus trihalide, the halogen whereof is halogen whose hydrohalic acid is a strong acid, and an aluminum salt of a strong hydrohalic acid to produce a ternary equimolar complex of these materials with each other.

17. A process which comprises mixing an olefinically unsaturated aliphatic perchlorocarbon, phosphorus trichloride, and aluminum trichloride to produce a ternary equimolar complex of these materials with each other.

18. A process which comprises mixing an aliphatic perhalocarbon, a phosphorus trihalide, and an aluminum halide to produce a ternary equimolar complex of these materials with each other, the halogen of said aliphatic perhalocarbon, of said phosphorus trihalide, and said aluminum halide being selected from the class consisting of chlorine, bromine and iodine.

References Cited in the file of this patent

J. Russ: Phys. Chem. Soc. 48, 1891–6 (1916); 48, 1896–1905 (1916).

Plotnikov: Chem. Abst. vol. 17 (1923), p. 3293.